(12) United States Patent
Ogasawara et al.

(10) Patent No.: US 7,396,552 B2
(45) Date of Patent: Jul. 8, 2008

(54) STABLE ACIDIC MILK DRINKS, PROCESS FOR PRODUCING THE SAME, AND ADDITIVE FOR ACIDIC MILK DRINKS TO BE USED THEREIN

(75) Inventors: Nobuhiro Ogasawara, Tokyo (JP); Ryoichi Akahoshi, Tokyo (JP); Shinji Hashimoto, Tokyo (JP); Eiichi Yamashita, Yao (JP); Keiichi Yamamoto, Yao (JP)

(73) Assignees: Kabushiki Kaisha Yakult Honsha, Tokyo (JP); Nitta Gelatin Inc., Osaka-shi (JP)

( * ) Notice: Subject to any disclaimer, the term of this patent is extended or adjusted under 35 U.S.C. 154(b) by 691 days.

(21) Appl. No.: 10/275,738

(22) PCT Filed: May 8, 2001

(86) PCT No.: PCT/JP01/03829

§ 371 (c)(1),
(2), (4) Date: May 14, 2003

(87) PCT Pub. No.: WO01/84943

PCT Pub. Date: Nov. 15, 2001

(65) Prior Publication Data

US 2003/0175398 A1 Sep. 18, 2003

(51) Int. Cl.
*A23C 9/00* (2006.01)

(52) U.S. Cl. .................... 426/580; 426/34; 426/43; 426/60; 426/573; 426/576; 426/583

(58) Field of Classification Search .................. 426/34, 426/42, 43, 60, 61, 62, 573, 574, 576, 580, 426/583
See application file for complete search history.

(56) References Cited

U.S. PATENT DOCUMENTS

| 4,130,555 A | | 12/1978 | Ohtsuka et al. |
| 4,426,443 A | * | 1/1984 | Shank ...................... 430/538 |
| 5,648,112 A | | 7/1997 | Yang et al. |

FOREIGN PATENT DOCUMENTS

| EP | 0 097 128 A2 | 12/1983 |
| EP | 521707 | 1/1993 |
| EP | 0 630 576 A2 | 12/1994 |
| JP | 52-12937 | 1/1977 |
| JP | 52-111600 | 9/1977 |
| JP | 60-12930 | 1/1985 |
| JP | 10-262569 | 10/1998 |
| JP | 11-75726 | 3/1999 |
| JP | 11-187851 | 7/1999 |
| JP | 2000-93121 | 4/2000 |
| RU | 2 044 498 C1 | 9/1995 |
| WO | WO 99/08541 | 2/1999 |

OTHER PUBLICATIONS

Tamime et al., Yoghurt Science and Technology, 1985, Pergamon Press, Oxford, pp. 26 and 254-256.*
U.S. Appl. No. 09/233,197, filed Jan. 20, 1999, Anbe et al.
U.S. Appl. No. 10/275,738, filed Nov. 8, 2002, Ogasawara et al.

* cited by examiner

*Primary Examiner*—Leslie Wong
(74) *Attorney, Agent, or Firm*—Oblon, Spivak, McClelland, Maier & Neustadt, P.C.

(57) ABSTRACT

Stable acidic milk drinks characterized by composed of an acidic milk drink base together with collagen peptides obtained by hydrolyzing collagen and stabilizers. Thus, it becomes possible to add a collagen substance to the existing drinks containing various stabilizers without worsening the stability of the drinks achieved by the stabilizer.

13 Claims, No Drawings

STABLE ACIDIC MILK DRINKS, PROCESS FOR PRODUCING THE SAME, AND ADDITIVE FOR ACIDIC MILK DRINKS TO BE USED THEREIN

This application is a 371 of PCT/JP01/03829, filed May 8, 2001.

FIELD OF THE INVENTION

The present invention relates to a stable acidic milk drink and, more particularly, to an acidic milk drink to which a low molecular weight collagen peptide (a gelatin hydrolysate), obtained by hydrolyzing collagen into lower molecules, is added, and to a stabilizer for the acidic milk drink.

DESCRIPTION OF BACKGROUND ART

Collagen is a major protein component forming connective tissues of animals. Collagen has conventionally been used in various cosmetics with an objective of providing the skin with tension and elasticity. More recently, collagen is attracting attention as a material for foods and the like due to the discovery of various physiological effects such as promotion of bone calcium absorption, activation of neurotransmission, and the like.

Various drinks into which collagen or collagen substance, such as gelatin (a collagen hydrolysate) or collagen peptide obtained by further hydrolyzing gelatin, is incorporated with an objective of reinforcing collagen are commercially available.

Fermented milk drinks obtained by acidifying milk by fermenting with lactic acid bacteria, Bifidobacterium group bacteria, yeasts, and the like and acidic milk drinks obtained by directly acidifying milk with an acidifier are excellent drink shaving a flavor characteristic to milk. However, if these drinks are stored for a long period of time, casein proteins in milk components are condensed and precipitated, impairing both the appearance and flavor. Milk proteins are stabilized by the addition of a stabilizer such as pectin, carboxymethylcellulose, propylene glycol arginate, water-soluble soybean polysaccharide, and the like. Many acidic milk drinks containing these stabilizers are commercially available.

However, if a collagen substance is added to fermented drinks or acidic milk drinks (hereinafter collectively referred to as "acidic milk drinks"), stabilization by the addition of the stabilizer is impaired. As a result, long-term storage stability becomes insufficient.

Although such a decrease in stability can be improved to a certain extent by adding a large amount of stabilizer, the addition of a large amount of stabilizer makes an unfavorable taste of the stabilizer predominant. Beverages easy to drink and having a good flavor cannot be obtained. In addition, the drinks become viscous and difficult to swallow. The long-term storage stability can be improved also by decreasing the amount of collagen substance added to the acidic milk drinks. The amount of collagen substance that improves the storage stability, however, is too small for the acidic milk drinks to exhibit the anticipated effect of the addition of collagen substance.

In this manner, it is difficult for acidic milk drinks containing various stabilizers to maintain their stability if collagen substance are added. Development of an acidic milk drink reinforced with collagen substance without impairing stability of milk proteins due to stabilizers has been desired.

DISCLOSURE OF THE INVENTION

The inventors of the present invention have conducted extensive studies to solve the above-described problems and have found that if a low molecular weight collagen peptide with a molecular weight of 1,000-8,700 is used in combination with a stabilizer, collagen substance can be added to acidic milk drinks without impairing the effect of the stabilizer, and drinks not only excelling in stability and flavor, but also capable of exhibiting physiological activity possessed by collagen can be obtained. This finding has led to the completion of the present invention.

Specifically, an object of the present invention is to provide a stable acidic milk drink comprising a low molecular weight collagen peptide produced by hydrolyzing collagen into lower molecules and a stabilizer.

Another object of the present invention is to provide an additive for acidic milk drinks comprising a low molecular weight collagen peptide produced by hydrolyzing collagen into lower molecules and a stabilizer.

Still another object of the present invention is to provide a method of producing a stable acidic milk drink comprising adding a low molecular weight collagen peptide with an average molecular weight of 1,000-8,700 during a process of producing an acidic milk drink which is stabilized by an stabilizer.

DETAILED DESCRIPTION OF THE INVENTION AND PREFERRED EMBODIMENT

The stable acidic milk drink of the present invention can be prepared by adding a low molecular weight collagen peptide produced by hydrolyzing collagen into lower molecules and a stabilizer to an acidic milk drink base.

The collagen peptide produced by hydrolyzing collagen into lower molecules added to an acidic milk drink base is a peptide produced from proteins or collagen-containing compounds, which are obtained from connective tissues such as the skin and bones of animals such as pigs and cows, by hydrolyzing these proteins or compounds with an acid, alkali, or enzyme. The collagen peptide has a lower molecular weight than gelatin obtained by heat denaturation of collagen.

There are several reports about low molecular weight collagen peptides produced by hydrolyzing collagen with an alkali or enzyme. For example, Japanese Patent Application Laid-open No. 111600/1977 discloses a cosmetic composition or a food improver comprising a low molecular weight collagen peptide. Japanese Patent Application Laid-open No. 12937/1977 discloses a method of reforming food by adding a low molecular weight collagen peptide with a molecular weight of 1,000-10,000. However, the addition of collagen peptide to drinks, particularly to acidic milk drinks, has not been known at all.

There are no specific limitations to the method of producing a low molecular weight collagen peptide of the present invention. The low molecular weight collagen peptide can be prepared by hydrolyzing collagen or gelatin, obtained from animal tissues such as the cow bone, cow skin, or pig skin by a conventional method, with an acid, alkali, or enzyme.

Enzymatic hydrolysis is preferable as a method of hydrolysis. Hydrolysis using an acid or alkali produces a salt when the acid or alkali is neutralized, resulting in an unfavorable flavor. In addition, since the molecular weight control is important for the stabilization of acidic milk drinks, hydrolysis using a protein hydrolytic enzyme (protease) such as papain, bromelain, and pepsine is preferable.

To achieve the object of the present invention, the collagen peptide obtained in this manner should have an average molecular weight of about 1,000-8,700, preferably 1,000-5,500, and particularly preferably 1,000-3,500. If the average molecular weight is less than 1,000, thick flavor originating from low molecular weight collagen peptide may be felt; if more than 8,700, stabilization improvement may be insufficient. Such hydrolyzed low molecular weight collagen peptides obtained in this manner exhibit the same various physiological activities as collagen.

The stabilizers added to the acidic milk drink base of the present invention are compounds capable of stabilizing proteins and the like which are coagulated or precipitated in an acidic pH region. Pectin, carboxymethylcellulose (CMC), propylene glycol alginate, water-soluble soybean polysaccharides, xanthan gum, gellan gum, and the like can be given as specific examples.

The type of stabilizer used in the acidic milk drink of the present invention may be determined taking into account properties flavor, and the like of the acidic milk drink to which the stabilizer is added. For example, excellent stability and flavor can be obtained by using pectin for fermented milk with high milk solid (pH: about 3.8-4.6). The use of water-soluble soybean polysaccharide is preferable for a low-calorie-type acidic milk drink with low milk solid (milk solid of non-fat: about 4.0 or less).

The use of one or more compounds selected from the group consisting of pectin, carboxymethylcellulose, propylene glycol alginate, and water-soluble soybean polysaccharides as a stabilizer together with a low molecular weight collagen peptide is particularly preferable due to the high effect of improving the decrease in stability when collagen substance are added to an acidic milk drink. Pectin particularly improves flavor of acidic milk drinks when used together with a low molecular weight collagen peptide.

Although there are no specific limitations to the amount of low molecular weight collagen peptide added to the acidic milk drink of the present invention, the amount of 0.01-5.0 weight %(hereinafter simply referred to as "%"), preferably 0.1-2.0%, and more preferably 0.1-1.0% of the final product is applicable. If less than 0.01%, the physiological effect of low molecular weight collagen peptide may not be sufficiently exhibited. If more than 5.0%, flavor of low molecular weight collagen peptide predominates, making it impossible to make a drink with a good flavor.

There are also no specific limitations to the amount of stabilizers added to the acidic milk drink. The amount may be in the range of 0.05-1.0%, preferably 0.1-1.0%, and more preferably 0.2-0.6% of the final product. If less than 0.05%, the effect of stabilizing milk proteins of the acidic milk drink may decrease; if more than 1.0%, an unfavorable flavor originating from the stabilizer may affect the flavor of the acidic milk drink.

The acidic milk drink of the present invention can be prepared by adding the low molecular weight collagen peptide and stabilizer to an acidic milk drink base.

Here, an acidic milk drink indicates a drink with a pH equal to or less than the isoelectric point (pH 4.4-5.2) of milk proteins and includes fermented milks, lactic acid bacteria diary drinks, lactic acid bacteria drinks, kefirs, and the like.

The acidic milk drink of the present invention can be produced according to a conventional method excepting for the addition of the low molecular weight collagen peptide and a stabilizer at any step of the process for producing the product. For example, fermented milk is produced as follows.

Lactic acid bacteria or Bifidobacterium group bacteria are inoculated and cultured in a sterilized milk culture medium. The cultured product is homogenized to obtain a fermented milk base. Next, a separately prepared syrup containing a low molecular weight collagen peptide and a stabilizer is added and the mixture is homogenized using a homogenizer or the like, followed by the addition of a flavor to obtain the final product. Other than the addition to syrup, the low molecular weight collagen peptide and stabilizer may be added to milk culture medium before or after the fermentation. In addition, the low molecular weight collagen peptide and stabilizer may be added either simultaneously or separately.

Various materials commonly used as food may be added to the acidic milk drink of the present invention prepared in this manner. Specific examples include saccharides such as glucose, sucrose, fructose, and honey, high sweetness sweeteners such as aspartame, suclarose, stevia, and acesulfume potassium, sugar-alcohols such as sorbitol, xylytol, erythritol, lactitol, and palatinit, and emulsifiers such as sucrose ester of fatty, polyglycerin ester of fatty acid, and lecithin. In addition, various vitamins such as vitamin A, vitamin B, vitamin C, and vitamin E; minerals such as calcium lactate, calcium gluconate, calcium pantothenate, various magnesium compounds, and various zinc compounds; herb extracts; and the like can be added.

An acidic milk drink additive which is a mixture of a low molecular weight collagen peptide and a stabilizer at an appropriate ratio can be used to incorporate the low molecular weight collagen peptide and stabilizer by a simple method.

The acidic milk drink additive can be prepared by suitably combining the above-described low molecular weight collagen peptide with an average molecular weight of about 1,000-8,700 and a stabilizer appropriate to the acidic milk drink to which such an additive is added. A composition obtained by combining such a syrup can be added more easily.

It is still to be clarified why the collagen substance interfere with the stabilizing effect of stabilizers and how the collagen substance controls the effect of decreasing the stabilizing effect. A possible elucidation may be related to a positive charge of collagen substance at a pH equivalent to or less than the isoelectric point (pH 4.5-9.5) and a negative charge of stabilizers used for acidic milk drinks. The electrical reaction between the stabilizer and collagen substance may cause them to combine and hinder the stabilizer from exhibiting the effect of stabilizing milk proteins. The use of low molecular weight collagen peptide having a small average molecular weight weakens the reaction with the stabilizer. This is thought to decrease the effect of collagen peptide to inhibit the stabilizing ability of stabilizers. It may be possible to appropriately change the hydrolysis conditions of collagen to alter the isoelectric point of collagen substance. However, the effect of altering the isoelectric point is not so large as the effect brought about a decreased molecular weight.

EXAMPLES

The present invention will be described in more detail by way of Preparation Examples and Examples which should not be construed as limiting the present invention.

The average molecular weight of the low molecular weight collagen peptides obtained in Preparation Examples was determined the following PAGI Method. The PAGI Method is a method of estimating the molecular weight distribution of collagen based on a chromatogram measured by the method of gel permeation of collagen solution with high performance liquid chromatograph.

(1) Weigh 0.2 g of sample into a 100 ml volumetric flask, add the eluent (0.05 mol potassium dihydrogenphosphate and 0.05 mol disodium hydrogenphosphate solution) and allow it to stand for 1 hour to make the sample to swell enough. Then, put it into a water bath of 40° C., dissolve it for 60 minutes. Allow it to cool until getting to room temperature, and add the eluent to a gauge line.

(2) Dilute the solution exactly 10 times with the eluent.

(3) Take a chromatogram by the gel permeation method of test solution.

Column: Shodex Asahipak GS 620 7G, 2 columns

Flow rate of eluent: 1.0 ml/min

Column temperature: 50° C.

Detection method: optical density, the wavelength at 230 nm (4) Take a profile for the molecular weight distribution of the sample that shows the optical density value at 230 nm on the vertical axis and the retention time horizontally to calculate the average molecular weight.

Preparation Example 1

Preparation of Collagen and Low Molecular Weight Collagen Peptide 1 kg of acid processed pig skin gelatin was dissolved in 4 kg of hot water at 75° C. After adjusting the temperature to 60° C., 0.5-10.0 g of papain W-40 (manufactured by Amano Pharmaceutical Co., Ltd.) was added as a protease. After treating with the enzyme for 10-180 minutes at pH 5.0-6.0 at 45-55° C., the mixture was heated at 85° C. for 10 minutes to deactivate the enzyme. The mixture was cooled down to 60° C., precise filtered, and spray dried to obtain gelatin hydrolysate in the form of powder having average molecular weight shown in Table 1.

Example 1

The acidic milk drinks were prepared by adding the collagen peptides prepared in Preparation Example 1 and pectin (a stabilizer) to a fermented milk base to evaluate their storage stability and flavor.

The acidic milk drinks were prepared as follows. 20 parts by weight of skim milk powder was added to 80 parts by weight of water. After sterilization for 3 seconds at 120° C., lactic acid bacteria was added to culture the bacteria for 24 hours, thereby obtaining a fermented milk base. 40 parts by weight of the obtained fermented milk base was homogenized at 15 Mpa using a homogenizer. The homogenized product was mixed with 60 parts by weight of syrup to obtain a fermented milk product. The syrup used was prepared by mixing and dissolving maltitol (5% in the final product), collagen peptide (0.3%), pectin (0.3%), and aspartame (0.01%), followed by serialization for 3 seconds at 120° C.

(1) Evaluation of Storage Stability

The acidic milk drink (fermented milk product) prepared by the above method was allowed to stand for 21 days at 10° C. to determine the properties on the 14th day and 21st day. The results are shown in Table 1. Precipitation was evaluated according to the following standard.

Evaluation of precipitation:

Scores: Description
  0: No precipitation
  1: Slight precipitation
  2: Some precipitation
  3: Significant precipitation

TABLE 1

| Fermented milk product | Molecular weight | PH 14 Day | PH 21 Day | Viscosity (mPa·s) 14 Day | Viscosity (mPa·s) 21 Day | Precipitation* 14 Day | Precipitation* 21 Day | Whey-off (mm) 14 Day | Whey-off (mm) 21 Day |
|---|---|---|---|---|---|---|---|---|---|
| C | Not added | 4.46 | 4.46 | 26 | 25 | 0 | 0 | 2 | 2 |
| T1 | 762 | 4.46 | 4.46 | 27 | 27 | 0 | 0 | 2 | 2 |
| T2 | 1210 | 4.46 | 4.46 | 29 | 30 | 0 | 0 | 2 | 2 |
| T3 | 1838 | 4.46 | 4.46 | 31 | 31 | 0 | 0 | 2 | 2 |
| T4 | 2500 | 4.46 | 4.46 | 27 | 27 | 1 | 1 | 2 | 3 |
| T5 | 3608 | 4.46 | 4.46 | 25 | 24 | 1 | 1 | 2 | 2 |
| T6 | 5418 | 4.46 | 4.46 | 21 | 22 | 1 | 2 | 2 | 4 |
| T7 | 5589 | 4.46 | 4.46 | 23 | 21 | 1 | 2 | 2 | 4 |
| T8 | 6913 | 4.46 | 4.46 | 27 | 26 | 1 | 2 | 2 | 4 |
| T9 | 8754 | 4.46 | 4.46 | 24 | 21 | 2 | 2 | 3 | 5 |
| T10 | 9523 | 4.46 | 4.46 | 21 | 20 | 2 | 3 | 4 | 6 |

*Visual observation

The results of Table 1 indicate that precipitation and separation of whey are small and there is no practical problem when a low molecular weight collagen peptide with a molecular weight of 8,700 or less, particularly 5,500 or less, is used. Particularly, when a collagen peptide with a molecular weight of 3,500 or less was added, acidic milk drinks as stable as those containing no collagen peptide were obtained.

(2) Evaluation of Flavor

The above acidic milk drinks (Products C, T1-T10) were evaluated for sensation. The testing personnel freely depicted the impression. The results are shown in Table 2.

Sensation evaluation:

Scores: Description
  0: Flavor is bad.
  1: Flavor is slightly bad.
  2: Flavor is fair.
  3: Flavor is good.

TABLE 2

| Fermented milk product | Freely depicted impression | Score |
|---|---|---|
| C | Refreshed, natural | 2 |
| T1 | Thick flavor, soup-like | 1 |
| T2 | Soft and refreshed | 3 |
| T3 | Easy to drink, natural | 3 |
| T4 | Easy to drink, refreshed | 3 |
| T5 | Easy to drink, refreshed | 3 |
| T6 | Easy to drink, refreshed | 3 |
| T7 | A slightly heavy texture | 2 |
| T8 | A slightly heavy texture | 2 |
| T9 | A slightly rough texture | 2 |
| T10 | A slightly rough texture | 2 |

As a result, excellent flavor and texture were obtained when a low molecular weight collagen peptide with an average molecular weight of 1,000 to 8,700 was used. Collagen peptides with an average molecular weight of 1,000 to 5,500 in particular produced acidic milk drinks with an excellent flavor, confirming effective control of unfavorable flavor peculiar to pectin.

Example 2

The acidic milk drinks were prepared by adding different amounts of the low molecular weight collagen peptide with an average molecular weight of 3,608 prepared in Preparation Example 1 and pectin (a stabilizer) to a fermented milk base. The acidic milk drinks after storage were evaluated in terms of properties and flavor (texture sensation) to examine the effect of concentrations of the low molecular weight collagen peptide and the stabilizer.

The acidic milk drinks were prepared as follows. 20 parts by weight of skim milk powder was added to 80 parts by weight of water. After sterilization for 3 seconds at 120° C., lactic acid bacteria was added to culture the bacteria for 24 hours, thereby obtaining a fermented milk base. 40 parts by weight of the obtained fermented milk base was homogenized at 15 Mpa using a homogenizer. The homogenized product was mixed with 60 parts by weight of syrup to obtain a fermented milk product. The syrup used was prepared by mixing and dissolving maltitol (5% in the final product), low molecular weight collagen peptide (0.1-5.0%), pectin (0.1-1.0%), and aspartame (0.01%), followed by sterilization for 3 seconds at 120° C.

(1) Evaluation of Storage Stability

The fermented milk products (acidic milk drinks) prepared by the above method were allowed to stand for 21 days at 10° C. to determine the presence or absence of precipitation after storage in the same manner as in Example 1. The results are shown in Table 3.

TABLE 3

| Amount of pectin | Amount of collagen | | | | | |
|---|---|---|---|---|---|---|
| | 0.1% | 0.3% | 0.5% | 1.0% | 2.0% | 5.0% |
| 0.1% | 2 | 2 | 2 | 2 | 3 | 3 |
| 0.2% | 1 | 1 | 1 | 1 | 2 | 2 |
| 0.3% | 1 | 1 | 1 | 1 | 1 | 2 |
| 0.6% | 1 | 1 | 1 | 1 | 1 | 2 |
| 1.0% | 1 | 1 | 1 | 1 | 1 | 1 |

As a result, products with a low molecular weight collagen peptide in the amount of 0.1-2.0%, particularly 0.1-1.0%, and pectin in the amount of 0.2-1.0%, particularly 0.3-1.0% were found to exhibit excellent storage stability.

(2) Evaluation of Flavor

The fermented milk products (acidic milk drinks) prepared by the above method were evaluated for texture sensation according to the following standard. The results are shown in Table 4.

Evaluation of texture sensation:

Score: Description
 0: Texture is bad and the product is highly viscous.
 1: Texture is slightly bad and the product is slightly viscous.
 2: Texture and viscosity are fair.
 3: Texture and viscosity are excellent.

TABLE 4

| Amount of pectin | Amount of collagen | | | | | |
|---|---|---|---|---|---|---|
| | 0.1% | 0.3% | 0.5% | 1.0% | 2.0% | 5.0% |
| 0.1% | 2 | 2 | 2 | 2 | 1 | 1 |
| 0.2% | 3 | 3 | 3 | 3 | 3 | 2 |
| 0.3% | 3 | 3 | 3 | 3 | 3 | 2 |
| 0.6% | 3 | 3 | 3 | 3 | 3 | 2 |
| 1.0% | 2 | 2 | 2 | 2 | 1 | 1 |

As a result, products with a low molecular weight collagen peptide in the amount of 0.1-5.0%, particularly 0.1-1.0%, and pectin in the amount of 0.1-1.0%, particularly 0.2-0.6% were found to exhibit a good flavor and an excellent texture sensation.

Example 3

Fermented Milk Drink (1) Preparation of Fermented Milk 20 parts by weight of skim milk powder was dissolved in 80 parts by weight of water. After sterilization for 3 seconds at 120° C., *Lactococcus lactis* YIT 2027 and *Bifidobacterium breve* YIT 4065 were inoculated in the total amount of 1.0%. The bacteria were cultured for 24 hours. The cultured product was homogenized at 15 Mpa using a homogenizer to obtain a fermented milk.

(2) Preparation of Syrup

Components shown below were dissolved in hot water at 50° C. and sterilized for 3 seconds at 120° C. to prepare a syrup solution.

(Syrup Solution Formulation)

Ultimate concentration in fermented milk drink (%)

| | |
|---|---|
| Maltitol | 5.0 |
| Low molecular weight collagen peptide (MW = 3,608) | 0.3 |
| Pectin | 0.3 |
| Aspartame | 0.01 |
| Polydextrose | 3.0 |
| Vitamin B6 | 0.005 |
| Vitamin B12 | 0.00005 |
| Folic acid | 0.0005 |
| Vitamin C | 0.3 |
| Perfume | 0.1 |

(3) Preparation of Fermented Milk Drink 40 parts by weight of the obtained fermented milk was mixed with 60 parts by weight of the syrup solution. The mixture was filled in a polystyrene container and sealed to obtain a fermented milk drink product. The fermented milk drink product was subjected to a sensation evaluation to find that the product had a good flavor and was highly stable after the product was allowed to stand for 2 weeks at 10° C.

Example 4

Fermented Milk Drink (1) Preparation of Fermented Milk 10 parts by weight of skim milk powder was dissolved in 90 parts by weight of water. After sterilization for 3 seconds at 120° C., 1% of *Lactococcus lactis* YIT2027 and 2% of *Streptococcus thermophilus* YIT 2001 were inoculated. The bacteria were cultured for 24 hours. The cultured product was homogenized at 15 Mpa using a homogenizer to obtain a fermented milk.

(2) Preparation of Syrup

Components shown below were dissolved in hot water at 50° C. and sterilized for 3 seconds at 120° C. to prepare a syrup solution.

(Syrup Solution Formulation)

Ultimate concentration in fermented milk drink (%)

| | |
|---|---|
| Sugar | 3.0 |
| Fructose | 2.0 |
| Low molecular weight collagen peptide (MW = 5,418) | 0.3 |
| Pectin | 0.4 |
| Strawberry juice | 5.0 |
| Vitamin E | 0.03 |
| Emulsified iron | 0.3 |
| Perfume | 0.1 |

(3) Preparation of Fermented Milk Drink 40 parts by weight of the obtained fermented milk was mixed with 60 parts by weight of the syrup solution. The mixture was filled in a polystyrene container and sealed to obtain a fermented milk drink product. The fermented milk drink product was subjected to a sensation evaluation to find that the product had a good flavor and was highly stable after the product was allowed to stand for 2 weeks at 10° C.

Example 5

Fermented Milk Drink (1) Preparation of Fermented Milk 24 parts by weight of skim milk powder was dissolved in 76 parts by weight of water. After sterilization for 3 seconds at 120° C., 0.3% of a mixture starter of *Lactobacillus casei* YIT 9029 and *Streptococcus thermophilus* YIT 2001 was inoculated. The bacteria were cultured for 24 hours at 35° C. The cultured product was homogenized at 15 Mpa using a homogenizer to obtain a fermented milk.

(2) Preparation of Syrup

Components shown below were dissolved in hot water at 50° C. and sterilized for 3 seconds at 120° C. to prepare a syrup solution.

| (Syrup solution formulation) | |
|---|---|
| | Final concentration in fermented milk |
| Maltitol | 5.0 |
| Aspartame | 0.01 |
| Polydextrose | 1.2 |
| Emulsified iron (Taiyo Chemical Co.) | 0.25 |
| Low molecular weight collagen peptide (MW = 1,838) | 0.5 |
| Pectin | 0.3 |
| Perfume | 0.1 |

(3) Preparation of Calcium Solution 5 parts by weight of calcium lactate was added to 95 parts by weight of water. The mixture was sterilized for 30 minutes at 98° C. (or for 3 seconds at 117° C.) to obtain a calcium solution.

(4) Preparation of Fermented Milk Drink 35 parts by weight of a fermented milk was mixed with 57 parts by weight of a syrup solution and the mixture was thoroughly stirred. 8 parts by weight of the above calcium solution was added and the mixture was stirred. The mixture was filled in a polystyrene container and sealed to obtain a fermented milk drink product. The fermented milk drink product was subjected to a sensation evaluation to find that the product had a good flavor and was highly stable after the product was allowed to stand for 2 weeks at 10° C.

INDUSTRIAL APPLICABILITY

The acidic milk drink of the present invention prepared by the method described above excels in stability and flavor and is reinforced with collagen substance due to inclusion of a milk protein stabilizer and a low molecular weight collagen peptide which does not inhibit the ability of the stabilizer.

Due to the addition of a low molecular weight collagen peptide to an acidic milk drink, not only physiological effects such as providing the skin with tension and elasticity, promotion of bone calcium absorption, activation of neurotransmission, and the like are expected, but also the acidic milk drink has a decreased unfavorable taste originating from a stabilizer due to the action of the peptide and excellent flavor.

What is claimed is:

1. An acidic milk drink comprising:
   an acidic milk drink base,
   collagen peptide which has an average molecular weight of 1,000-8,700 and which may be produced by hydrolyzing collagen, and
   at least one stabilizer.

2. The acidic milk drink of claim 1, wherein the acidic milk drink base has been fermented with a lactic acid producing bacterium.

3. The acidic milk drink of claim 1, wherein the acidic milk drink base has been fermented with *Bifidobacterium*.

4. The acidic milk drink of claim 1, wherein the acidic milk drink base has been fermented with a yeast.

5. The acidic milk drink of claim 1, wherein the acidic milk drink base has been prepared by adding an acidifier to a milk base.

6. The acidic milk drink of claim 1, wherein the collagen peptide has an average molecular weight ranging from 1,000-5,500.

7. The acidic milk drink of claim 1, wherein the collagen peptide has an average molecular weight ranging from 1,000-3,500.

8. The acidic milk drink of claim 1, wherein the content of the collagen peptide ranges from 0.1-2.0 weight %.

9. The acidic milk drink of claim 1, wherein the stabilizer is selected from the group consisting of pectin, carboxymethylcellulose, propylene glycol alginate, and water-soluble soybean polysaccharides.

10. The acidic milk drink of claim 1, where in the amount of the stabilizer added ranges from 0.1-1.0 weight %.

11. The acidic milk drink of claim 1, wherein the acidic milk base is a fermented milk having a pH ranging from 3.8 to 4.6 and the stabilizer comprises pectin.

12. The acidic milk drink of claim 1, wherein the acidic milk base is a fermented non-fat milk having a solid content of 4.0 or less, and the stabilizer comprises a water-soluble soybean polysaccharide.

13. A method for producing the acidic milk drink of claim 1, comprising:

admixing an acidic milk base with a collagen peptide having an average molecular weight of 1,000-8,700 and with a stabilizer.

* * * * *